US010291854B2

United States Patent
Sato et al.

(10) Patent No.: US 10,291,854 B2
(45) Date of Patent: May 14, 2019

(54) IMAGE CAPTURE APPARATUS AND METHOD OF CONTROLLING THE SAME

(71) Applicant: CANON KABUSHIKI KAISHA, Tokyo (JP)

(72) Inventors: Akihiko Sato, Yamato (JP); Yoshinobu Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 15/254,089

(22) Filed: Sep. 1, 2016

(65) Prior Publication Data

US 2017/0078578 A1 Mar. 16, 2017

(30) Foreign Application Priority Data

Sep. 10, 2015 (JP) ................. 2015-178878

(51) Int. Cl.
*H04N 5/232* (2006.01)
*H04N 5/265* (2006.01)
*G06K 9/00* (2006.01)

(52) U.S. Cl.
CPC ..... *H04N 5/23293* (2013.01); *G06K 9/00221* (2013.01); *H04N 5/23212* (2013.01); *H04N 5/265* (2013.01)

(58) Field of Classification Search
CPC ........... H04N 5/23212; H04N 5/23293; H04N 5/265; G06K 9/00221
USPC ......... 386/263; 382/275, 312; 348/341, 349; 396/102
See application file for complete search history.

(56) References Cited

U.S. PATENT DOCUMENTS

| | | | |
|---|---|---|---|
| 7,505,074 B2 | 3/2009 | Yoshino et al. | |
| 7,782,379 B2 | 8/2010 | Sato | |
| 8,248,429 B2 | 8/2012 | Sato | |
| 8,446,424 B2 | 5/2013 | Sato | |
| 8,610,979 B2 | 12/2013 | Sato | |
| 8,948,545 B2* | 2/2015 | Akeley | H04N 9/045 382/312 |
| 8,995,785 B2* | 3/2015 | Knight | H04N 5/23293 382/275 |
| 9,030,601 B2 | 5/2015 | Sato | |
| 2011/0012996 A1* | 1/2011 | Mori | H04N 13/0239 348/47 |
| 2012/0027393 A1* | 2/2012 | Tsuda | H04N 5/23212 396/102 |
| 2013/0222633 A1 | 8/2013 | Knight et al. | |
| 2014/0035959 A1* | 2/2014 | Lapstun | H04N 13/0402 345/690 |
| 2014/0218593 A1* | 8/2014 | Yamada | H04N 5/23212 348/349 |
| 2017/0134639 A1* | 5/2017 | Pitts | H04N 5/23212 |
| 2017/0201674 A1* | 7/2017 | Yamamoto | H04N 5/23212 |

* cited by examiner

*Primary Examiner* — Thai Q Tran
*Assistant Examiner* — Stephen R Smith
(74) *Attorney, Agent, or Firm* — Venable LLP

(57) ABSTRACT

A moving image, obtained by an image capture unit for obtaining light-field data, is successively displayed. When displaying an assistance display indicating information related to light-field data to be obtained with present shooting parameters together with the moving image, the assistance display is controlled such that during moving image recording is being performed, visibility of the moving image is not degraded by the assistance display in comparison to a case where moving image recording is not being performed.

10 Claims, 11 Drawing Sheets

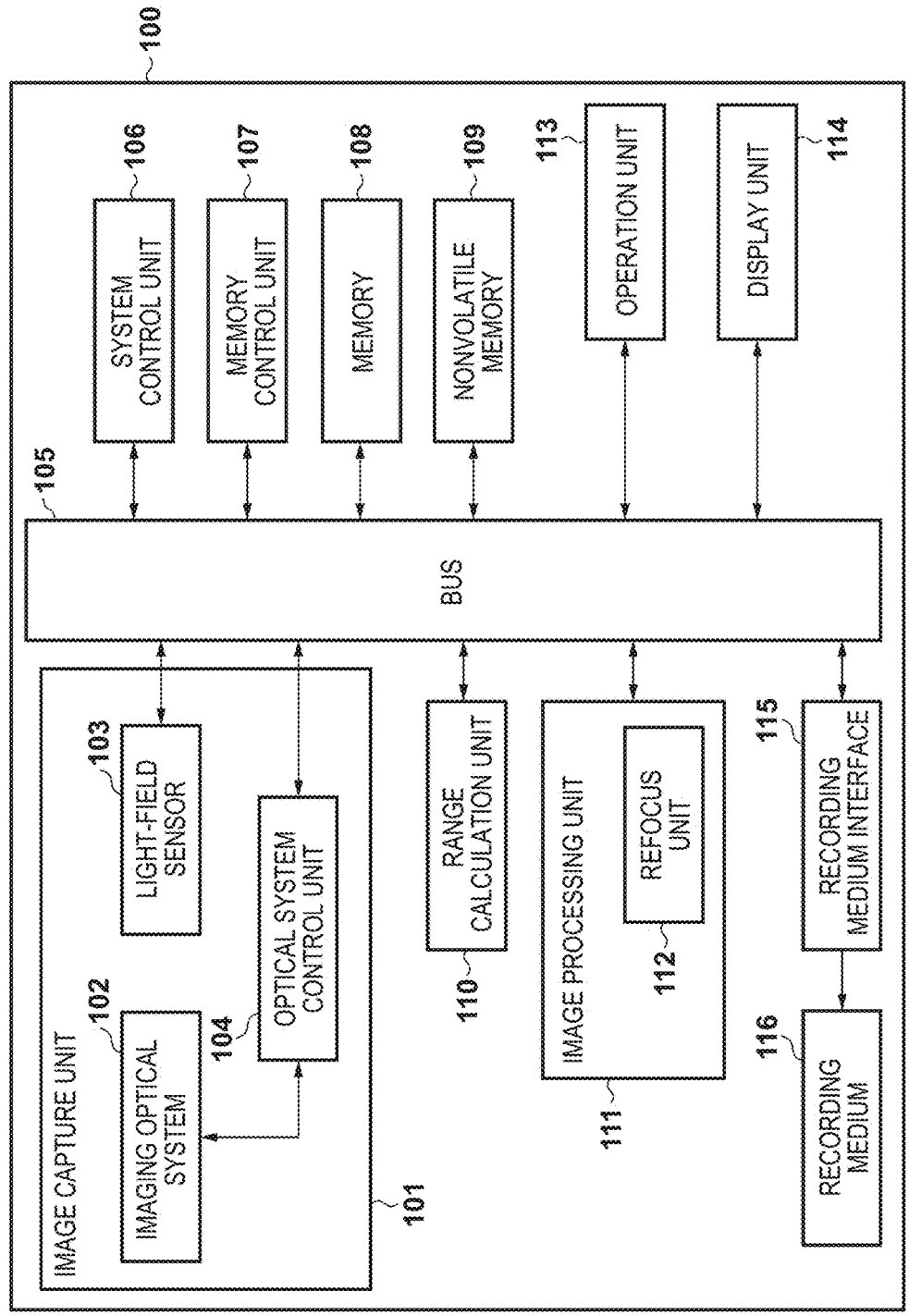

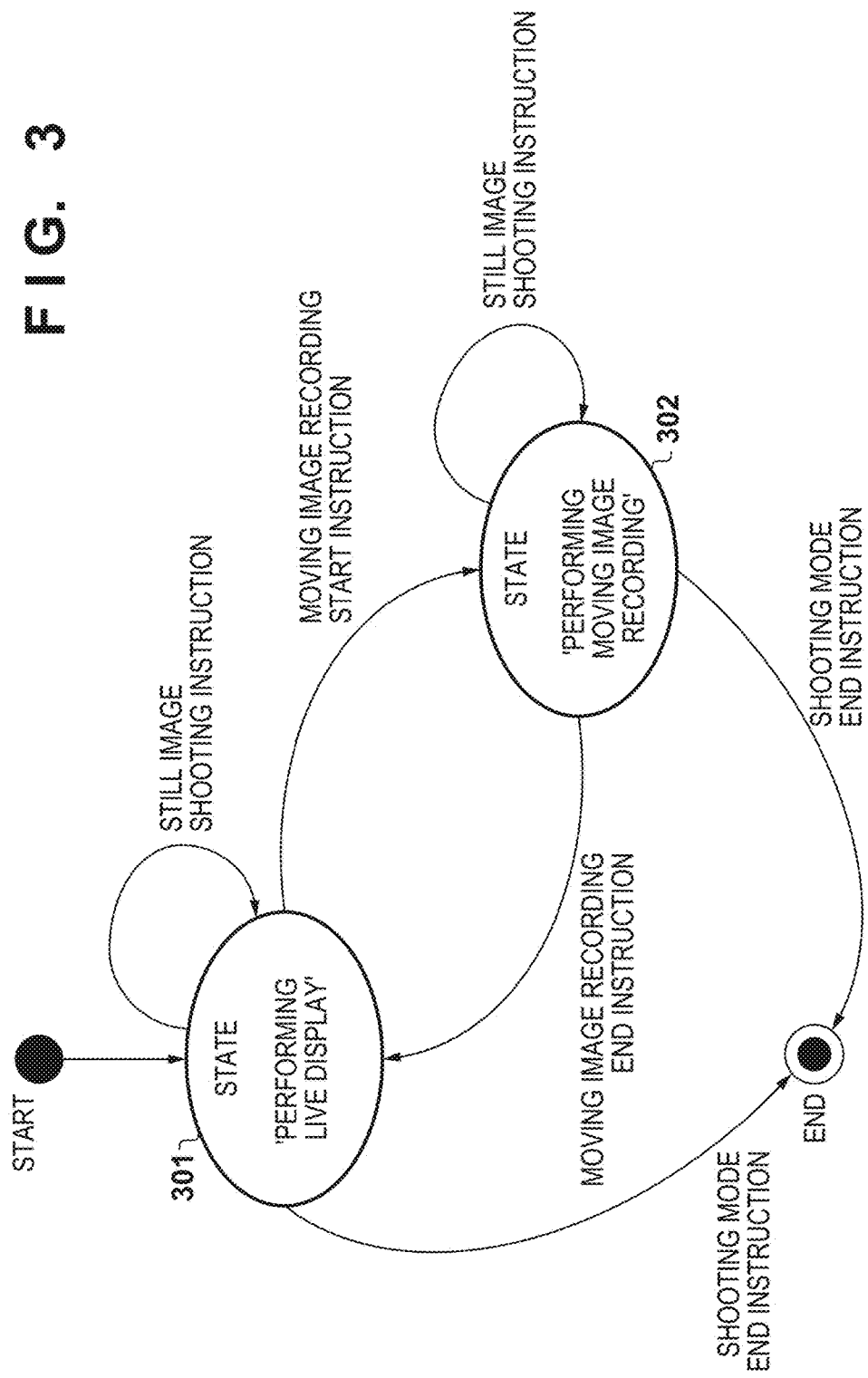

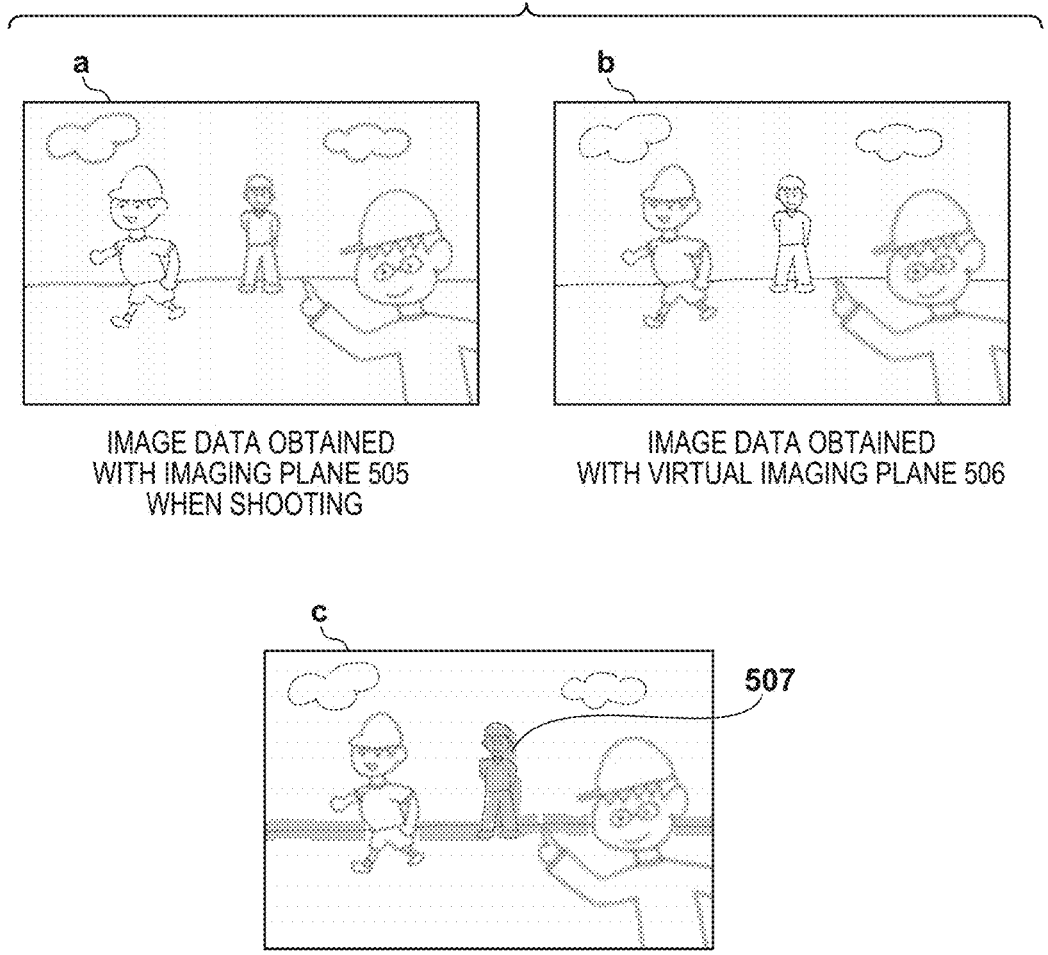

F I G. 7A
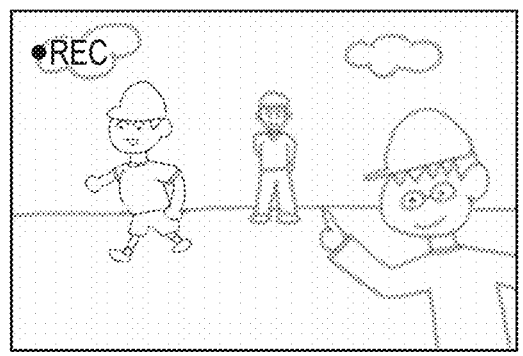
F I G. 7B
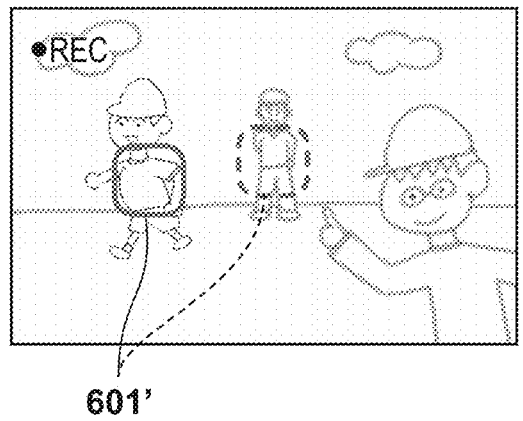

IMAGE CAPTURE APPARATUS AND METHOD OF CONTROLLING THE SAME

BACKGROUND OF THE INVENTION

Field of the Invention

The present invention relates to an image capture apparatus and a method of controlling the image capture apparatus, and more specifically relates to an image capture apparatus capable of generating light space information (also referred to as light-field data), and a method of controlling this image capture apparatus.

Description of the Related Art

In recent years, image capture apparatuses have been proposed that are capable of recording an intensity in each incidence direction of light that is incident in a divided area of an imaging plane of an image sensor, and such an image capture apparatus is called a light-field camera or the like. Also, from data (light-field data or light space information) recorded by the light-field camera, it is possible to reconfigure an image (below, collectively referred to as a refocus image) in which subject distance, shooting viewpoint, depth of field, and the like used when focusing are set differently than when shooting was performed. Also, processing to generate a refocus image from light-field data is referred to as reconfiguring processing or refocus processing.

US 2013/0222633 A1 discloses, as a shooting assist function in a light-field camera, performing superimposed display of information indicating a subject included in a distance range where focusing by refocus processing is possible (a refocusable range) on a live-view image. Thus, a user can start shooting after confirming that a plurality of subjects on which the user wishes to focus are included in the refocusable range. Also, it is possible to change shooting parameters as necessary such that the plurality of subjects on which the user wishes to focus are included in the refocusable range.

The assist function disclosed in US 2013/0222633 A1 applies to live-view display during a standby state in still image shooting, and display during playback of recorded data, but nothing is disclosed regarding display control during moving image recording. On the other hand, when the assist function disclosed in US 2013/0222633 A1 is applied as-is to display during moving image recording, there are cases where visibility of the movie being recorded decreases due to the information displayed superimposed, or changes in luminance, color, or the like of the display image.

SUMMARY OF THE INVENTION

The present invention was made in consideration of such problems in the conventional technology, and provides a shooting assist function appropriate for circumstances, in an image capture apparatus capable of obtaining light-field data and a method of controlling the image capture apparatus.

According to an aspect of the present invention, there is provided an image capture apparatus, comprising: an image capture unit configured to obtain light-field data; and a control unit configured to successively display a moving image obtained by the image capture unit in a display apparatus; wherein the control unit displays an assistance display indicating information related to light-field data to be obtained with present shooting parameters together with the moving image in the display apparatus, and the control unit controls the assistance display such that during moving image recording is being performed, visibility of the moving image is not degraded by the assistance display in comparison to a case where moving image recording is not being performed.

According to another aspect of the present invention, there is provided a method of controlling an image capture apparatus, comprising: during successively displaying a moving image in a display apparatus, the moving image being obtained by an image capture unit configured to obtain light-field data, displaying an assistance display indicating information related to light-field data to be obtained with present shooting parameters together with the moving image in the display apparatus; and controlling the assistance display such that during moving image recording is being performed, visibility of the moving image is not degraded by the assistance display in comparison to a case where moving image recording is not being performed.

Further features of the present invention will become apparent from the following description of exemplary embodiments with reference to the attached drawings.

BRIEF DESCRIPTION OF THE DRAWINGS

FIG. 1 is a block diagram showing an exemplary functional configuration of a digital camera serving as one example of an image capture apparatus according to an embodiment.

FIG. 3 is a state transition diagram showing state transitions in a shooting mode of a digital camera according to an embodiment.

FIGS. 5A to 5C schematically show shooting states presumed in an embodiment.

FIGS. 7A and 7B schematically show an exemplary assistance display of a 'performing moving image recording' state in an embodiment.

DESCRIPTION OF THE EMBODIMENTS

Figure 2A:
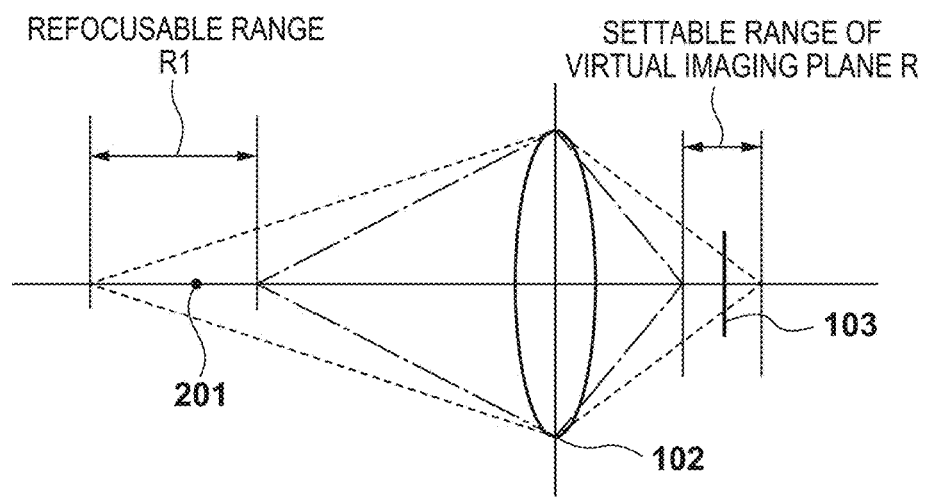
FIGS. 2A and 2B illustrate a refocusable range in an embodiment.

Exemplary embodiments of the present invention will now be described in detail in accordance with the accompanying drawings. FIG. 1 is a block diagram showing an exemplary functional configuration of a digital camera 100 serving as one example of an image capture apparatus according to an embodiment of the present invention. Note that the present invention can be implemented in an arbitrary electronic device capable of obtaining or generating parallax images.

An image capture unit 101 is configured with an imaging optical system 102, a light-field sensor 103, and an optical system control unit 104. The imaging optical system 102 is configured with a lens group, a shutter, an aperture, and the like, and forms an optical image of a subject on the light-field sensor 103. The imaging optical system 102 may also be an interchangeable-type optical system.

The light-field sensor 103 is an image sensor having a pupil division function. The light-field sensor 103 of the present embodiment has a microlens array in which a plurality of microlenses are arranged in two dimensions, and by having a plurality of photoelectric conversion elements or photoelectric conversion areas arranged associated with individual microlenses, realizes a pupil division function. However, it is also possible to use another arbitrary well-known technology whereby it is possible to obtain parallax images, such as a method using a multi-lens camera.

From each of the plurality of photoelectric conversion elements associated with the same microlens, it is possible to obtain output corresponding to partial pupils that do not overlap each other within an exit pupil of the imaging optical system 102, that is, output corresponding to an intensity of light that is incident from different directions. Below, such an output group is referred to as light-field data. Also, by summing the output of the plurality of photoelectric conversion elements associated with the same microlens, output corresponding to the entire exit pupil can be obtained. The light-field data obtained by the light-field sensor 103 is stored in a memory 108.

The optical system control unit 104 controls driving of the lens group or the aperture based on control information such as a focus position or an aperture value instructed from a system control unit 106.

A bus 105 connects respective blocks such that data or control signals can be communicated between blocks.

The system control unit 106 has a programmable processor (such as a CPU or MPU), and by executing a program recorded in a nonvolatile memory 109, realizes functions of the digital camera 100, including each process of the present embodiment described below. Note that at least a portion of operation of the system control unit 106 may also be realized by hardware such as an ASIC.

A memory control unit 107 writes data to the memory 108 based on requests from each block. The system control unit 106 and each block can store temporary data or the like being used in an operation to the memory 108.

The memory 108 records various data such as light-field data obtained from the image capture unit 101. The memory 108 has a storage capacity capable of storing light-field data or still image data of a predetermined number of images, or moving image data of a predetermined time period.

The nonvolatile memory 109 is a memory capable of electrically erasing or recording, such as an EEPROM for example. Numerical constants, settings values, programs, GUI data, or the like used by the system control unit 106 or the like are stored in the nonvolatile memory 109.

A range calculation unit 110 calculates a refocusable range in a subject space, using control information of the imaging optical system 102 output by the system control unit 106.

Figure 2B:
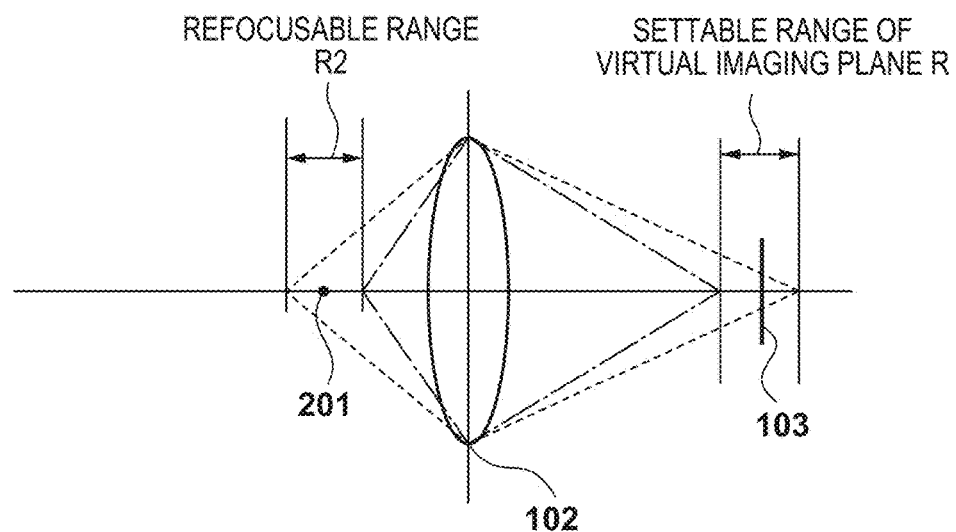

Here, the relationship between the refocusable range and the control information of the imaging optical system 102 will be described with reference to FIGS. 2A and 2B. FIGS. 2A and 2B show the relationship between the refocusable range and the positional relationship of a subject 201, the imaging optical system 102, and the light-field sensor 103.

Refocus processing is processing to generate (reconfigure) an image formed on a virtual imaging plane from light-field data. The refocusable range is a subject distance range corresponding to a range of positions on the optical axis where a virtual imaging plane can be set, determined according to the configuration of the light-field sensor 103. The refocusable range can also be described as a range of focus distances (subject distances corresponding to a focus area in an image) that can be adjusted using the light-field data.

The refocusable range changes according to the distance between the imaging optical system 102 (the focusing lens) and the imaging plane position (the light-field sensor 103) when shooting. FIGS. 2A and 2B schematically show the positional relationship of the subject 201, the imaging optical system 102 (the focusing lens), and the light-field sensor 103 when shooting, and also refocusable ranges R1 and R2 of the light-field data obtained by shooting.

FIG. 2B shows a case where the subject 201 is closer than in FIG. 2A. Note that in FIGS. 2A and 2B, the positions of the subject 201 and the light-field sensor 103 are shown with reference to the position of the imaging optical system 102, so the position of the light-field sensor 103 may appear to have changed. However, actually the position of the light-field sensor 103 has not changed, but rather, the position of the imaging optical system 102 (the focusing lens) has changed.

As shown in FIGS. 2A and 2B, when the focus distance (distance of the subject 201) of the imaging optical system 102 becomes smaller, the distance between the imaging optical system 102 and the light-field sensor 103 becomes larger. As a result, the refocusable range that corresponds to the settable range R of the virtual imaging plane decreases as the focus distance (distance of the subject 201) of the imaging optical system 102 decreases, so R1>R2.

The settable range of the virtual imaging plane and the optical properties of the imaging optical system 102 can be known in advance, so it is possible to calculate the refocusable range if the focus distance when shooting with certain properties is known. For example, refocusable ranges may be calculated for a plurality of discrete focus distances in advance, and held by the range calculation unit 110 in a table that can be referred to according to the focus distance. Note that in a case where the imaging optical system 102 is an interchangeable-type optical system, or the focus distance is variable, a plurality of tables can be prepared according to parameters that can change. Also note that a formula for calculating the refocusable range from the focus distance may be prepared, and the refocusable range calculated according to that formula.

The range calculation unit 110 obtains, as information related to the focus distance when shooting, information (subject distance information or focus distance information) that is output in order for the system control unit 106 to control the focus distance of the imaging optical system 102. Then, using the above-described table or the like, the range calculation unit 110 obtains refocusable range information of light-field data obtained with the present shooting parameters, and stores this information in the memory 108.

An image processing unit 111 performs predetermined image processing on light-field data or image data supplied from the image capture unit 101 or the memory control unit 107, such as size processing such as pixel interpolation or reduction, color conversion processing, white balance adjustment processing, or encoding processing.

The image processing unit 111 is also provided with a refocus unit 112. The refocus unit 112 applies refocus processing to light-field data to generate data of an image (a refocus image) in a virtual imaging plane that was set at an arbitrary position within a virtual imaging plane settable range corresponding to the refocusable range. The image processing unit 111 stores the image data generated by the refocus unit 112 in the memory 108, through the memory control unit 107.

Also, from the light-field data, the image processing unit 111 may calculate an evaluation value used in an autofocus function, or may calculate luminance information used in automatic exposure control, or may detect a subject area, for example such as a face. Based on this information, the system control unit 106 sets a focus detection area, decides a focus distance, and decides exposure parameters (aperture value, shutter speed, and shooting sensitivity), for example. Then, the system control unit 106 outputs control information for realizing the decided focus distance and exposure parameters to the image capture unit 101.

An operation unit 113 is an input device group for a user to input instructions to the digital camera 100. Representative input devices included in the operation unit 113 include a power switch, a release button, a movie record button, a menu button, direction keys, an operation mode selection dial, a touch panel, and the like, but such input devices are not limited to these.

A display unit 114, for example, has a display apparatus such an LCD, and displays image data, various information of the digital camera 100, a GUI such as a menu screen, or the like supplied from the image processing unit 111 or the memory control unit 107.

A recording medium interface 115 is an interface for accessing a recording medium 116 such as a memory card or a hard disk.

A recording medium 116 is a medium for recording light-field data, still image data, or moving image data that has been shot, and is configured from a semiconductor memory, a magnetic disk, or the like. Preferably, at least a portion of the recording medium 116 is in a removable form, such as a memory card for example.

Note that the exemplary configuration of the digital camera 100 shown in FIG. 1 and described here is merely one example, and a configuration may also be adopted in which a constituent element not shown in FIG. 1 is included, or in which some of the constituent elements shown in FIG. 1 do not exist. Also, a configuration may be adopted in which constituent elements shown separately in FIG. 1 are collected in a single constituent element, or in which a function described as the function of a single constituent element is realized by a plurality of constituent elements.

FIG. 3 is a state transition diagram showing state transitions in the shooting mode of the digital camera 100 of the present embodiment. The shooting mode is an operation mode for performing shooting of a still image or a movie. The digital camera 100 additionally has a plurality of operation modes such as a playback mode and a setting mode, and operates in an operation mode that has been selected by an operation mode selection dial or the like included in the operation unit 113.

A 'performing live display' STATE 301 is a shooting mode initial state, and corresponds to a so-called shooting standby state. When in the 'performing live display' STATE 301, the digital camera 100 executes movie shooting, and realizes a live-view function by successively displaying a shot movie in the display unit 114. Note that for a movie being displayed by the live-view function, each frame may be generated from the light-field data, and frames may be generated by summing the output of a plurality of photoelectric conversion units associated with the same microlens. Also, an assistance display function related to the light-field data, described later, is implemented in at least this state.

In the 'performing live display' STATE 301, when an instruction to start moving image recording is input, for example by a movie record button being pressed or the like, the digital camera 100 transitions to a 'performing moving image recording' STATE 302, and starts a moving image recording operation.

In the 'performing moving image recording' STATE 302, the digital camera 100 records, to the recording medium 116, moving image data configured from light-field data obtained at a predetermined frame rate from the image capture unit 101. Also, as in the 'performing live display' STATE 301, the digital camera 100 generates moving image data for display, and displays this moving image data in the display unit 114.

When an instruction to end moving image recording is input, for example by the movie record button being pressed again the like, the digital camera 100 transitions again to the 'performing live display' STATE 301.

Note that in the digital camera 100 of the present embodiment, input of an instruction to start still image shooting or an instruction to end the shooting mode (an instruction to move to another operation mode) is always possible in the shooting mode. If an instruction to start still image shooting is input, the digital camera 100 performs still image shooting processing, records the light-field data to the recording medium 116, and then returns to the state when the instruction was input. Also, if an instruction to end the shooting mode is input, the digital camera 100 executes subsequent processing to the next operation mode.

Figure 4A:
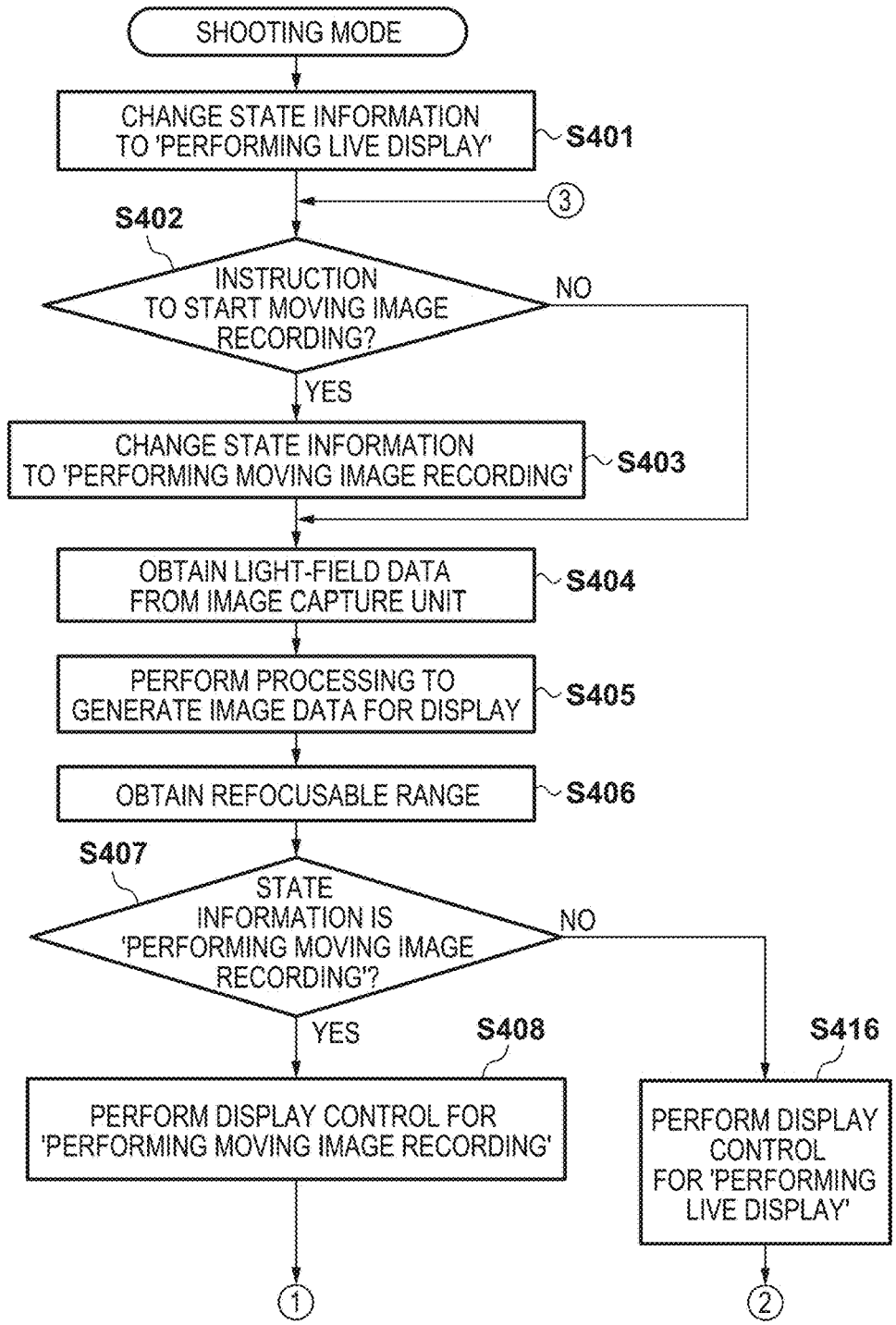
FIGS. 4A and 4B are flowcharts showing operation in the shooting mode of the digital camera according to an embodiment.
Figure 4B:
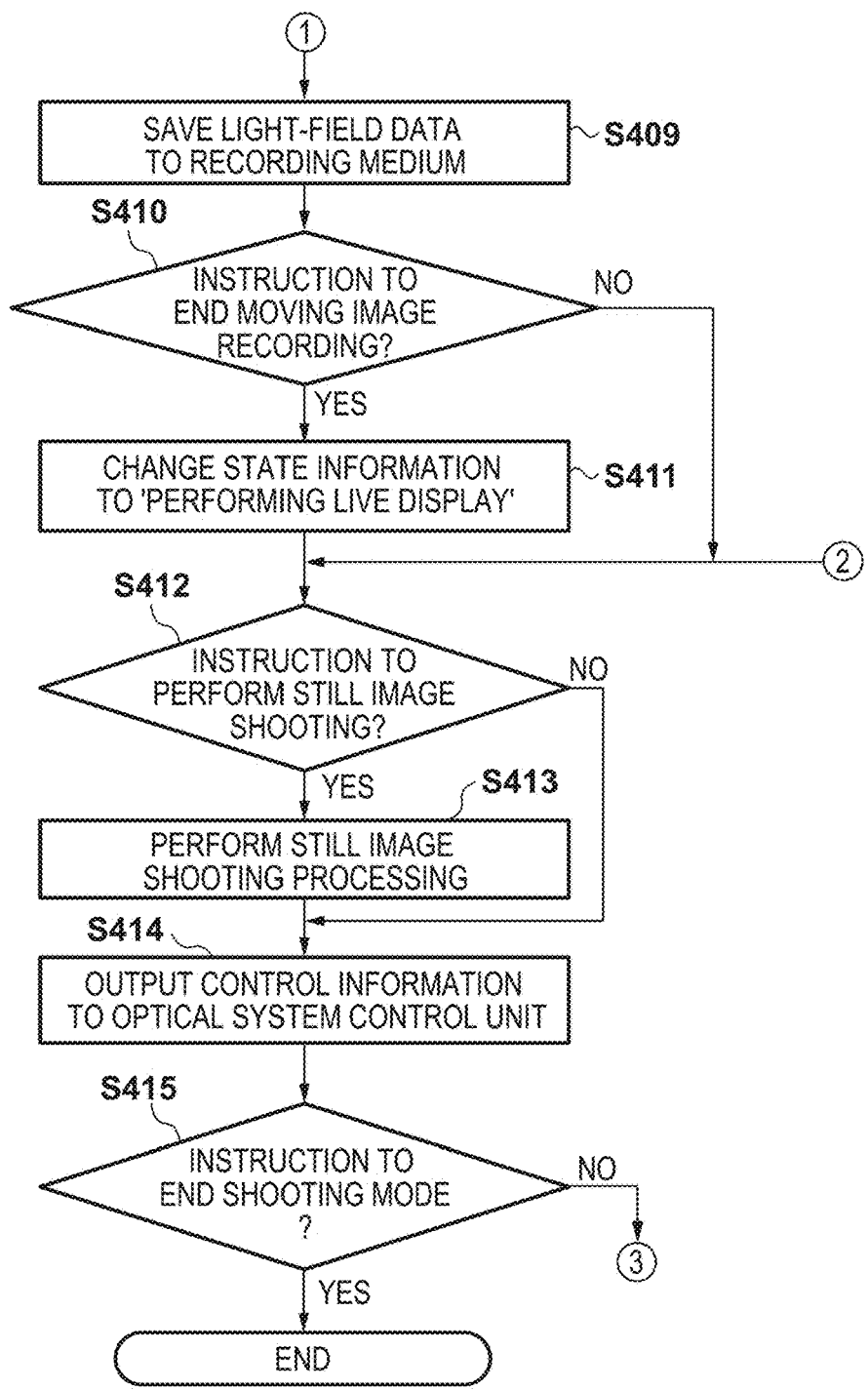

Next, operation in the shooting mode of the digital camera 100 will be further described with reference to the flowcharts in FIGS. 4A and 4B. For example, this operation is executed immediately after startup of the digital camera 100, or when there has been a change from another operation mode to the shooting mode.

In step S401, the system control unit 106 updates state information stored in the nonvolatile memory 109 for example to 'performing live display'. This corresponds to processing performed when initially transitioning from a start state START to the 'performing live display' STATE 301 in FIG. 3.

In step S402, the system control unit 106 determines whether or not an instruction to start moving image recording has been input from the operation unit 113, and when determined that such an instruction has been input, the system control unit 106 moves processing to step S403, and when determined that such an instruction has not been input, the system control unit 106 moves processing to step S404.

In step S403, the system control unit 106 updates the state information to 'performing moving image recording'. This corresponds to processing for the transition from the 'performing live display' STATE 301 to the 'performing moving image recording' STATE 302 in FIG. 3.

In step S404, the system control unit 106 reads out light-field data for one frame from the light-field sensor 103. The memory control unit 107 stores the light-field data that was read out to the memory 108.

In step S405, the system control unit 106 generates image data for display from the light-field data using the image processing unit 111. The image data for display is moving image data used for live-view display in order to check the movie being recorded. Accordingly, an image at the present imaging plane position can be generated by adding the output of a plurality of photoelectric conversion areas associated with the same microlens. Of course, image data for display may also be generated by using refocus processing to generate an image in the imaging plane when shooting. Note that commonly, the resolution (display resolution) of the display unit 114 is less than the resolution (recording resolution) of an image for recording. Therefore, image data for display is generated by applying reduction processing corresponding to the display resolution in the image processing unit 111. The image data for display generated by the image processing unit 111 is stored in the memory 108 by the memory control unit 107.

Also, the image processing unit 111 calculates evaluation values or the like used for autofocus or automatic exposure control or the like based on the image data for display that was generated (or alternatively image data prior to reduction), and supplies the calculated values to the system control unit 106. Note that any publicly known method can be used for autofocus, and the image processing unit 111 calculates evaluation values according to the method used. For example, in a case where autofocus is performed using a contrast detection scheme, the image processing unit 111 calculates a contrast evaluation value in a focus detection area. Also, in a case where autofocus is performed using an imaging plane phase difference detection scheme, the image processing unit 111 uses parallax image data obtained from the light-field data to calculate a defocus amount and a defocus direction. Regarding automatic exposure control as well, any publicly known method can be used, and as evaluation values, for example, the image processing unit 111 can calculate an average luminance of a subject area (such as a face area), an average luminance of each area when a screen is divided into a plurality of areas, a luminance histogram of an entire screen, or the like.

The system control unit 106 decides exposure parameters, focusing lens position, and the like based on the evaluation values or the like calculated by the image processing unit 111, and generates control information of the imaging optical system 102. The generated control information is stored in the memory 108 by the memory control unit 107, without being output to the optical system control unit 104 at this time.

In step S406, the system control unit 106 obtains a refocusable range using the range calculation unit 110. As described above, the range calculation unit 110 obtains the refocusable range using the control information stored in the memory 108, specifically information related to the focus distance of the imaging optical system (for example, information related to the focusing lens position). Also, if the imaging optical system 102 is an interchangeable-type optical system, the range calculation unit 110 obtains characteristic information of the imaging optical system 102 that was obtained from the imaging optical system 102 and stored in the memory 108 when starting up, for example. The refocusable range is stored in the memory 108 by the memory control unit 107.

Note that the refocusable range may be expressed in any manner as long as it is possible to specify a distance range in the optical axis direction from the digital camera 100 in the subject space. For example, distances on the near side and the distant side in the distance range may be expressed with a numerical value 'm', or a distance range may be expressed with a code that has been assigned in advance.

In step S407, the system control unit 106 determines whether or not the state information stored in the nonvolatile memory 109 is 'performing moving image recording', and when determined that the state information is 'performing moving image recording', the system control unit 106 advances processing to step S408, and when determined that the state information is not 'performing moving image recording', the system control unit 106 advances processing to step S416.

In step S408, the system control unit 106 performs display control in the 'performing moving image recording' state. Specifically, the system control unit 106 displays the image data for display (generated in step S405) stored in the memory 108 in the display unit 114. As described later, in the present embodiment, the assistance display is not performed in the 'performing moving image recording' state, or visibility of the live-view image is not allowed to be impaired in comparison to the assistance display when not in the 'performing moving image recording' state. The live-view display in the 'performing moving image recording' state is used in order to check image quality or angle of view of an image being recorded, so in the present embodiment, visibility of the live-view image is given priority over visibility of the assistance display. Alternatively, not reducing visibility of the live-view image is given priority over providing light-field data information by the assistance display. A specific display example will be described later.

In the present embodiment the system control unit 106 is capable of displaying an assistance display for providing to the user information related to light-field data obtained with the present image capture parameters, together with a live-view image, in the display unit 114. The assistance display can express the information provided by an arbitrary text, mark, graphic, or the like. Note that in the present embodiment, information related to the refocusable range of light-field data obtained with the present image capture parameters is presented using the assistance display. However, the information related to the light-field data presented using the assistance display is not only information related to the refocusable range. The information may be other information related to the light-field data obtained, or arbitrary information that affects the light-field data. In a non-limiting example, a read-out mode (such as whether photoelectric conversion areas are added, or a quantity of added photoelectric conversion areas) of a plurality of photoelectric conversion areas having a common subject distance, present focus distance, and microlens, or characteristic information of the imaging optical system 102 or the light-field sensor (image sensor) 103, or the like may be included.

In step S409, the system control unit 106 records the light-field data for one frame that was obtained in step S404 to the recording medium 116 through the recording medium interface 115. Note that when newly performing recording, the system control unit 106 performs generation processing of a file having a predetermined format, records the first frame of light-field data to the generated file, and data of frames read afterward are additionally recorded to the same file. Note that a configuration may also be adopted in which not only light-field data, but also image data for display is also recorded. Also, when recording image data for display, interframe predictive coding may also be adopted. Encoding processing for reducing the amount of data may also be applied to the light-field data.

In step S410, the system control unit 106 determines whether or not an instruction to end moving image recording has been input through the operation unit 113, and when determined that an ending instruction has been input, the system control unit 106 advances processing to step S411, and when determined that an ending instruction has not been input, the system control unit 106 advances processing to step S412.

In step S411, the system control unit 106 the system control unit 106 changes the state information stored in the nonvolatile memory 109 to 'performing live display'. This corresponds to processing for the transition from the 'performing moving image recording' STATE 302 to the 'performing live display' STATE 301 in FIG. 3.

In step S412, the system control unit 106 determines whether or not an instruction to perform still image shooting has been input through the operation unit 113. The shooting instruction can be pressing of a release button, for example.

When determined that a shooting instruction has been input, the system control unit 106 advances processing to step S413, and when determined that a shooting instruction has not been input, the system control unit 106 advances processing to step S414. Note that in a case where the instruction related to still image shooting is divided into an instruction to start pre-shooting processing (for example, a half-press of the release button) and an instruction to start shooting processing (for example, a full press of the release button), in step S412 a determination regarding input of the instruction to start shooting processing can be performed.

In step S413, the system control unit 106 performs still image shooting processing. In the still image shooting processing in the 'performing moving image recording' state, the system control unit 106 may temporarily interrupt moving image recording and execute processing in the same manner as when not performing moving image recording, or may generate a still image from a frame image of a movie. Alternatively, another configuration may be adopted. The processing related to still image shooting can be performed using a well-known arbitrary method, so a description of the details of that processing is omitted. Also, a configuration may be adopted in which the system control unit 106 detects a pre-shooting instruction prior to a still image shooting instruction, performs autofocus processing or automatic exposure control for still image shooting, and starts the still image shooting processing when a shooting instruction is detected. The system control unit 106 records the still image file that was obtained by shooting to the recording medium 116.

In step S414, the system control unit 106 reads out the control information that was generated in step S405 from the memory 108 and outputs this control information to the optical system control unit 104. Based on the control information, the optical system control unit 104 controls the focusing lens position and aperture opening diameter of the imaging optical system 102 in order to perform shooting of the next frame.

In step S415, the system control unit 106 determines whether or not an instruction to end the shooting mode (an instruction to move to another operation mode) has been input through the operation unit 113. When determined that an ending instruction has been input, the system control unit 106 ends the shooting mode processing. This corresponds to processing for the transition from the 'performing moving image recording' STATE 302 or the 'performing live display' STATE 301 to an ending state END in FIG. 3. Also, when not determined that an ending instruction has been input, the system control unit 106 returns processing to step S402, and executes processing for the next frame.

In step S416, the system control unit 106 performs display control in the 'performing live display' state. Specifically, the system control unit 106 displays the image data for display (generated in step S405) that is stored in the memory 108, together with an assistance display related to the refocusable range, in the display unit 114. The live-view display in the 'performing live display' state is used in order to decide, for example, an angle of view or a subject on which to focus or the like in the shooting standby state. Therefore, in the present embodiment, providing information of the refocusable range by the assistance display is given priority over the visibility of the live-view image being decreased by the assistance display. A specific display example will be described later.

Specific Example of Assistance Display

Next a specific example of live-view display control in the present embodiment will be described with reference to FIGS. 5A to 7B.

Figure 5A:
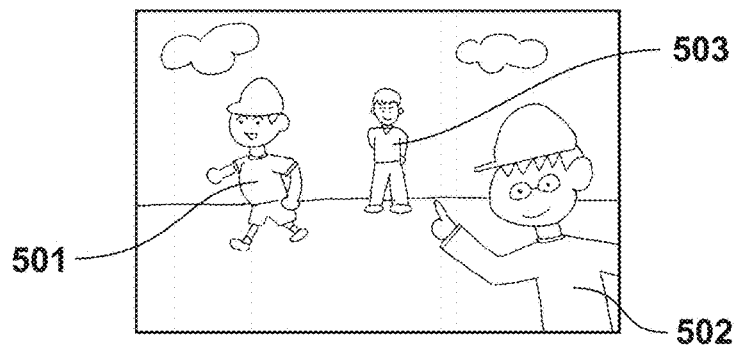
Figure 5B:
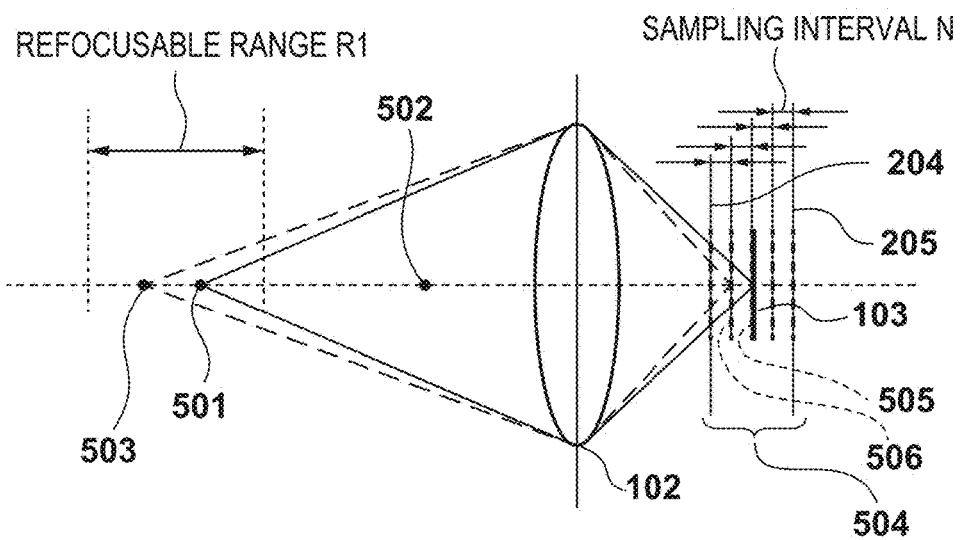

Here, in a scene where subjects 501 to 503 having different distances from the digital camera 100 exist as shown in FIGS. 5A and 5B, it is presumed that light-field data is obtained by performing shooting with focus on the subject 501. Also, it is presumed that the subject 503 is included in the refocusable range, but the subject 502 is outside of the refocusable range, as shown in FIG. 5B.

Frame a in FIG. 5C schematically shows image data that was obtained at an imaging plane 505 when shooting (image data in which the focus distance has not been changed). This image data can also be described as refocus (reconfigured) image data obtained by setting the position of the light-field sensor 103 at a virtual imaging plane on the optical axis of the imaging optical system 102.

In a case where assistance display of the refocusable range is performed in the live-view image as in the 'performing live display' state, it is necessary to at least detect an area on which to focus in the refocusable range. The method for realizing this detection is not particularly limited, but in the present embodiment, the position of the virtual imaging plane is changed to generate a plurality of refocus images, and an area expressed as a logical sum of focus areas in individual refocus images is calculated. Note that refocus images are generated for a plurality of virtual imaging planes (a virtual imaging plane group 504), including both ends of a settable range of the virtual imaging plane. Also, a configuration may be adopted in which subject detection processing such as face detection is performed for the focus area that was detected with the individual refocus images, and the results of detection are associated with the refocus images. For example, the results of detection may be information representing: whether or not a subject was detected; or if a subject was detected, the position, size, or the like of a subject area. Note that the detection results may also be results of using a face area that was detected as a clue to detect hands and feet, a torso, or the like.

Note that a subject within the refocusable range can be more precisely detected as a setting interval (a sampling interval) N (see FIG. 5B) of the virtual imaging plane used to generate refocus images becomes smaller. However, when the quantity of refocus images generated becomes large, this leads to an increase in processing time and power consumption, so it is possible to determine an appropriate sampling interval in advance. Note that the focus distances corresponding to virtual imaging plane positions may also be calculated, and associated with the generated refocus images.

It is possible to calculate an evaluation value, for example used in a contrast detection scheme, with the image processing unit 111, and detect an area composed of pixels for which the size of the evaluation value is at least a threshold value as the focus area in a refocus image. For example, with refocus image data that was generated for a virtual imaging plane 506 such that the subject 503 is in focus as shown in frame b in FIG. 5C, a focus area 507 shown in gray in frame c in FIG. 5C is detected.

By calculating a logical sum of the focus area detected in this way for each refocus image generated for different virtual imaging plane positions, an image area corresponding to the refocusable range is calculated for the image displayed in a live-view display. Note that a configuration may also be adopted in which an image area corresponding to a refocusable area is calculated while holding information of the focus distance for the focus area that was detected in each refocus image.

Also, the focus area detection may be performed not in pixel units, but in divided area units that are the result of dividing an image in the horizontal and vertical directions. In this case, a focus area can be detected based on a representative evaluation value for each divided area. The representative evaluation value can be determined in advance to be a peak value, a most frequent value, an average value (a simple average or an average weighted by frequency), or the like.

The system control unit 106 can implement the processing described here using mainly the image processing unit 111 and the memory 108 as a part of the display control processing of the 'performing live display' in step S416. Also, the system control unit 106 executes the assistance display using information of the image area corresponding to the subject within the refocusable range. The assistance display may have any form, as long as it is possible to confirm the relationship between the live-view image and the refocusable range in the display unit 114.

Here, as one example, it is presumed that an assistance display is superimposed at a representative position (for example, a center position) of a focus area (an area A) corresponding to the focus distance of the imaging optical system 102 when shooting (that is, the area in focus in the live-view image) and an area (an area B) included in the refocusable range, and corresponding to a different focus distance than the focus distance of the imaging optical system 102 when shooting. A display example is shown in FIG. 6A.

Figure 6A:
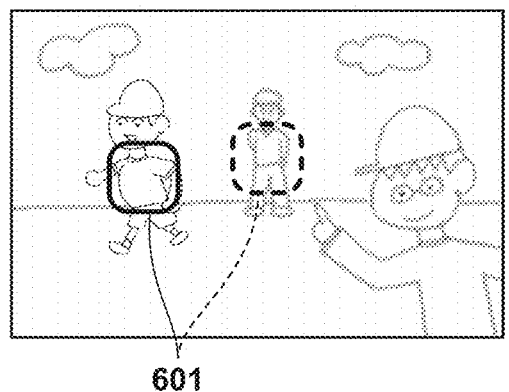
FIGS. 6A to 6D schematically show an exemplary assistance display of a 'performing live display' state in an embodiment.

FIG. 6A shows an example in which, within the area A and the area B, a frame-like assistance display 601 is superimposed at the representative position of the detected subject areas. Here, the form of the frames is made to differ such that it is possible to distinguish the areas, with a frame having a solid line for the area that is presently in focus, and a frame having a dotted line for the area that can be focused on by refocusing. Note that this is only one example, and a configuration may also be adopted in which one or more of frame color, thickness, outline shape, or display method (such as flashing or not flashing) are made to differ.

Figure 6B:
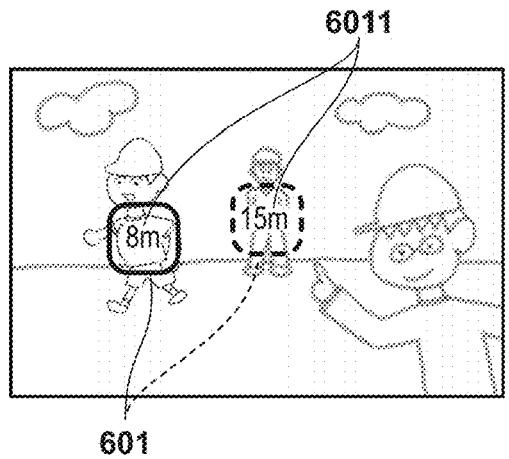

FIG. 6B shows an example in which a subject distance information 6011 has been added to the assistance display in FIG. 6A. As described above, in a case where it is possible to use information of a subject distance corresponding to a virtual imaging plane that was set in order to generate a refocus image when detecting a focus area, the subject distance information may be included in the assistance display. Note that the position (image coordinates) where the assistance display is performed is not limited to a center position as long as the correspondence with the focus area can be recognized, and may be at another position.

Figure 6C:
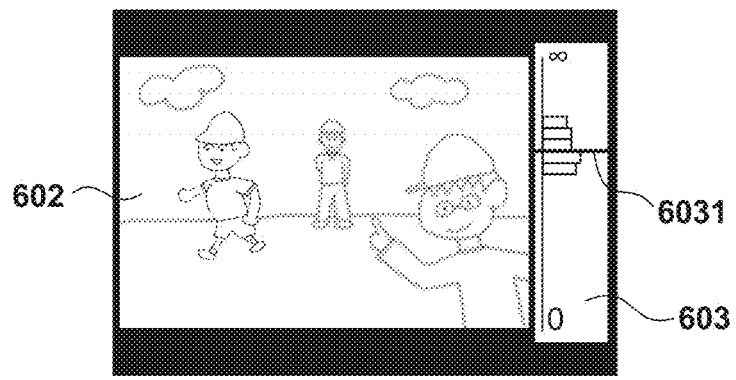

FIG. 6C shows an example of an assistance display 603 that is not superimposed on a live-view image 602. This sort of assistance display 603 can be realized by, for example, reducing the live-view image 602 to generate the display area of the assistance display 603. Alternatively, in a case where the display area of the assistance display 603 exists even without reducing the live-view image 602, such as in a case where the aspect ratio of the live-view image 602 is different than the aspect ratio of the display unit 114, it is not necessary to reduce the live-view image 602. In the assistance display 603, a quantity of pixels of the focus area detected in each refocus image generated for the above-described virtual imaging plane group 504 is expressed in the form of a per-subject distance histogram.

In the assistance display 603, subject distance is shown on the vertical axis and frequency is shown on the horizontal axis. Also, an index 6031 indicates the focus distance (distance of the subject 501) when shooting. The frequency can be used as a guideline for the size of the focus area. Also, the range of the subject distance for which a frequency is indicated corresponds to the settable range of the virtual imaging plane, so the refocusable range can be read from the vertical axis. Note that a configuration may also be adopted in which, in a case where subject detection is being performed, an index indicating the focus distance of a detected subject is shown in the histogram.

Figure 6D:
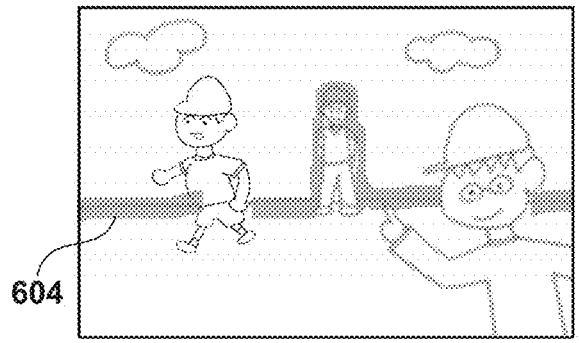

FIG. 6D shows an example of an assistance display 604 in which edge detection is performed by the image processing unit 111 on an image area corresponding to the refocusable range, and edge emphasis display in the same manner as so-called peaking is performed. This example has the benefit that the image area corresponding to the refocusable range can be visibly known.

Note that the examples shown in FIGS. 6A to 6D can also be implemented in a combined manner. Also, these are only examples, and other forms of assistance display are also possible.

On the other hand, regarding the display control of the 'performing moving image recording' state in step S408, a configuration may be adopted in which (1) assistance display related to the refocusable range is not performed (FIG. 7A), or in which (2) in a case where assistance display related to the refocusable range is performed, in consideration of visibility of the live-view image, the assistance display is not allowed to be more noticeable than in the 'performing live display' state (visibility is not degraded) (FIG. 7B).

In the case of (2), by causing the form (at least one of thickness, color, opacity, quantity, shape, and luminance) of the assistance display that is displayed superimposed on the live-view image to differ from the assistance display in the 'performing live display' state, it is possible to suppress a reduction in the visibility of the live-view image due to the assistance display. FIG. 7B shows an example in which by lightening the color of the frame in comparison to the assistance display in FIG. 6A, opacity is lowered. Other than this example, it is also possible to reduce the quantity of frames, reduce frame thickness, or reduce frame size.

It is also possible to perform an assistance display that is not superimposed on the live-view image (an assistance display that is displayed in a separate area from the live-view image), as shown in FIG. 6C. However, the live-view image is reduced no more than is necessary. A configuration may be adopted in which the assistance display is performed in an area where the live-view image is not displayed, which occurs in a case where, for example, the aspect ratio of the display unit 114 or an external display apparatus that has been connected to the digital camera 100 is different from the aspect ratio of the shot image. In this case, the live-view image is not reduced, so visibility of the live-view image is not affected by presence or absence of the assistance display.

Also, it is possible to perform assistance display such as is shown in FIG. 6D by reducing the degree of edge emphasis in comparison to the 'performing live display' state.

As described above, according to the present embodiment, when performing live-view display in an image capture apparatus that is capable of recording light-field data, the method of assistance display is made to differ according to whether or not moving image recording is being performed. Specifically, when moving image recording is being performed, assistance display is performed such that visibility of the live-view image is given more priority over visibility of the assistance display than when moving image recording is not being performed, or assistance display is not performed. Therefore, it is possible to provide information useful for deciding shooting parameters in a shooting standby state without preventing checking of the image actually being recorded when performing moving image recording, and thus possible to improve convenience for the user.

Modified Example

In the above described embodiment, a case is considered where the digital camera 100 is capable of still image shooting when performing moving image recording. In this case, when a configuration is adopted in which assistance display related to the refocusable range is performed when not performing moving image recording, and assistance display is not performed when performing moving image recording, it is difficult to obtain light-field data (a still image) having a desired refocusable range. Therefore, a configuration can be adopted in which assistance display is performed in a case where an instruction to perform still image shooting was input during moving image recording.

Other than operation in the shooting mode, the present modified example is preferably the same as in the above embodiment, so a description of the configuration of the digital camera 100 is omitted here.

Figure 8A:
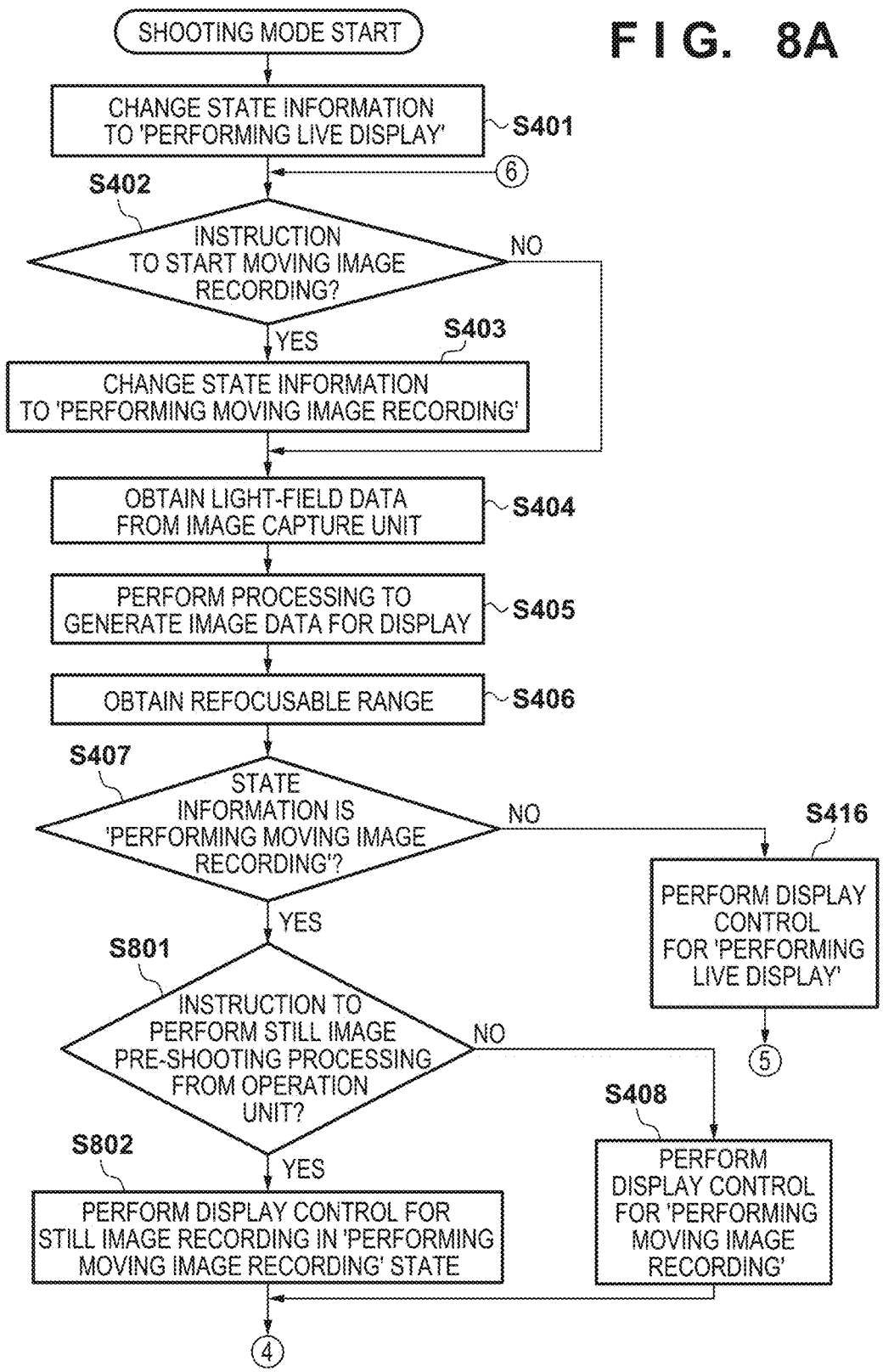
FIGS. 8A and 8B are flowcharts showing operation in the shooting mode of a digital camera according to a modified example of an embodiment.
Figure 8B:
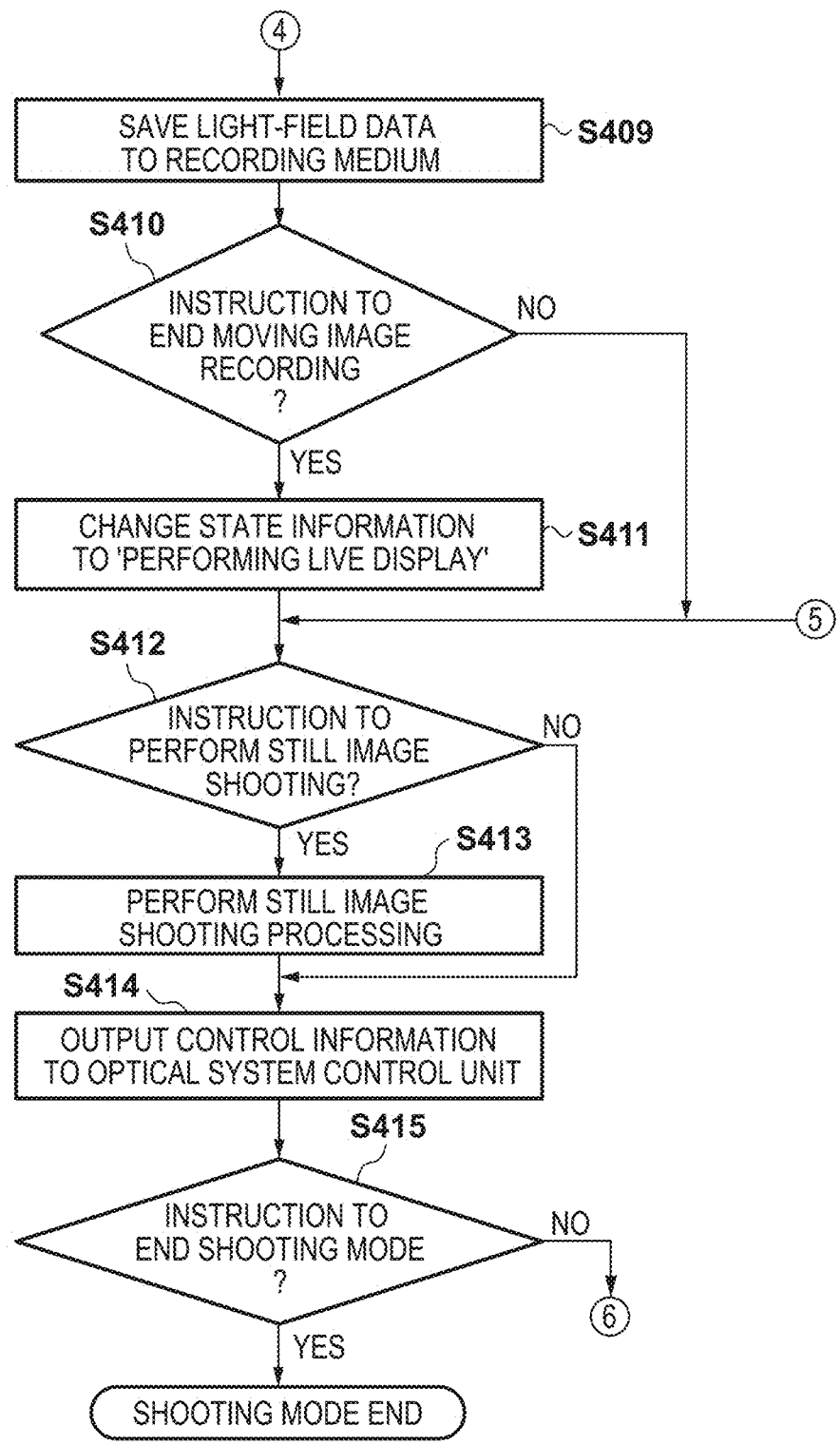

FIGS. 8A and 8B are flowcharts showing operation in a shooting mode of a digital camera according to the present modified example. Note that in FIGS. 8A and 8B, steps in which similar processing as in FIGS. 4A and 4B is performed are assigned the same reference numerals as in FIGS. 4A and 4B, a duplicate description is omitted here, and steps in which processing particular to the present embodiment is performed will be described.

In step S407, the system control unit 106 determines whether or not the state information stored in the nonvolatile memory 109 is 'performing moving image recording', and when determined that the state information is 'performing moving image recording', the system control unit 106 advances processing to step S801, and when determined that the state information is not 'performing moving image recording', the system control unit 106 advances processing to step S416.

In step S801, the system control unit 106 determines whether or not an instruction to shoot a still image has been input through the operation unit 113, and when determined that a shooting instruction was input, the system control unit 106 advances processing to step S802, and when determined that a shooting instruction has not been input, the system control unit 106 advances processing to step S408. Note that in a case where the instruction related to still image shooting is divided into an instruction to start pre-shooting processing (for example, a half-press of the release button) and an instruction to start shooting processing (for example, a full press of the release button), in step S801 it is preferable to make a determination regarding input of the instruction to start pre-shooting processing. In this case, a determination is made regarding input of the instruction to start shooting processing in step S412.

In step S802, the system control unit 106 performs display control for assisting still image shooting, including assistance display. Specifically, when not in a 'performing movie display' state, similar display control as the display control performed in step S416 is preferably performed, but a different display control may also be executed, such as display control that improves convenience of the assistance display related to the refocusable range, for example. For example, it is conceivable to indicate the refocusable range as a range of numerical values, and to not perform a display regarding the relationship with a subject or an area in a live-view image, but these are not limitations.

According to the present embodiment, in a period in which an instruction related to still image shooting is being input, such as during moving image recording or a half-press of the release button, assistance display related to the refocusable range is performed with priority related to visibility of the live-view image degraded in comparison to a period in which such an instruction is not being input. Therefore, in addition to the effects of the embodiment, with respect to still image shooting performed during moving image recording, it is possible to provide information related to light-field data obtained by shooting to the user, and therefore possible to assist shooting of a still image having a refocusable range desired by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-178878, filed on Sep. 10, 2015, which is hereby incorporated by reference herein in its entirety.

What is claimed is:

1. An image capture apparatus comprising:
a processor;
a memory that stores a program that is executable by the processor and, when executed by the processor, causes the processor to function as units comprising:
(1) an image capture unit configured to obtain light-field data; and
(2) a control unit configured to successively display a moving image obtained by the image capture unit in a display apparatus,
wherein the control unit displays an assistance display indicating information related to light-field data to be obtained with present shooting parameters together with the moving image in the display apparatus, and
wherein the control unit controls the assistance display such that during moving image recording being performed, visibility of the moving image is not degraded by the assistance display in comparison to a case where moving image recording is not being performed, and
wherein the control unit performs the assistance display in a period where an instruction related to still image shooting is being input during moving image recording, and does not perform the assistance display in a period where the instruction is not being input during moving image recording.

2. The image capture apparatus according to claim 1, wherein the information related to light-field data includes information related to a range where a focus distance can be adjusted using the light-field data.

3. The image capture apparatus according to claim 1, wherein the control unit does not display the assistance display during moving image recording.

4. The image capture apparatus according to claim 1, wherein the control unit displays the assistance display and the moving image in separate display areas, respectively.

5. The image capture apparatus according to claim 1, wherein the control unit:
superimposes the assistance display on the moving image; and
gives the assistance display during moving image recording a form that is not more noticeable than the assistance display in a case where moving image recording is not being performed.

6. The image capture apparatus according to claim 5, wherein the control unit causes at least one of thickness, color, opacity, quantity, shape, and luminance of the assistance display during moving image recording to differ from the assistance display in a case where moving image recording is not being performed.

7. The image capture apparatus according to claim 1, wherein the assistance display indicates, within an area of the moving image, an area of which distance is included in a range where a focus distance can be adjusted using the light-field data.

8. The image capture apparatus according to claim 1, wherein, within an area of the moving image, the assistance display has different forms in an area presently in focus and in an area that can be focused on using the light-field data.

9. The image capture apparatus according to claim 1, wherein the assistance display indicates, within an area of the moving image, a distance of a subject included in a range where a focus distance can be adjusted using the light-field data.

10. A method of controlling an image capture apparatus, the method comprising:
during successively displaying a moving image in a display apparatus, the moving image being obtained by an image capture unit configured to obtain light-field data,
(1) displaying an assistance display indicating information related to light-field data to be obtained with present shooting parameters together with the moving image in the display apparatus; and
(2) controlling the assistance display such that during moving image recording being performed, visibility of the moving image is not degraded by the assistance display in comparison to a case where moving image recording is not being performed,
wherein in the controlling, the assistance display is displayed in a period where an instruction related to still image shooting is being input during moving image recording, while the assistance display is not displayed in a period where the instruction is not being input during moving image recording.

* * * * *